(12) United States Patent
Wendell et al.

(10) Patent No.: US 7,311,115 B1
(45) Date of Patent: Dec. 25, 2007

(54) COLLECTION VALVE FOR WATER RECLAMATION SYSTEM

(75) Inventors: Donald Wendell, San Diego, CA (US); Joseph A. Casali, San Diego, CA (US)

(73) Assignee: Southwest Water Solutions L.L.C., San Diego, CA (US)

( * ) Notice: Subject to any disclaimer, the term of this patent is extended or adjusted under 35 U.S.C. 154(b) by 199 days.

(21) Appl. No.: 10/906,566

(22) Filed: Feb. 24, 2005

Related U.S. Application Data (63) Continuation-in-part of application No. 10/616,891, filed on Jul. 9, 2003, now Pat. No. 6,904,926.

(60) Provisional application No. 60/521,141, filed on Feb. 25, 2004, provisional application No. 60/319,387, filed on Jul. 10, 2002.

(51) Int. Cl.
*F16K 11/04* (2006.01)

(52) U.S. Cl. .................................. 137/119.1; 137/236.1

(58) Field of Classification Search ........... 137/119.01, 137/119.03, 119.05, 119.1, 115.25, 236.1, 137/875, 876
See application file for complete search history.

(56) References Cited

U.S. PATENT DOCUMENTS

| | | | | |
|---|---|---|---|---|
| 2,099,939 | A | * 11/1937 | McDougall | ............ 137/118.04 |
| 2,553,177 | A | * 5/1951 | Davis | .................... 137/118.01 |
| 3,915,857 | A | 10/1975 | Olson | |
| 4,039,005 | A | * 8/1977 | Clifford | ...................... 137/875 |
| 4,112,972 | A | 9/1978 | Lajeuness | |
| 4,162,218 | A | 7/1979 | McCormick | |
| 4,180,088 | A | 12/1979 | Mallett | |
| 4,228,006 | A | 10/1980 | Hanna | |
| 4,294,278 | A | * 10/1981 | Blake | .................... 137/115.26 |
| 4,705,060 | A | 11/1987 | Goulbourne | |
| 5,099,874 | A | 3/1992 | Della Cave | |
| 5,106,493 | A | 4/1992 | McIntosh | |
| 5,117,660 | A | 6/1992 | Downs et al. | |
| 5,147,532 | A | 9/1992 | Leek | |
| 5,173,180 | A | 12/1992 | Stewart | |
| 5,192,426 | A | 3/1993 | DeCoster et al. | |
| 5,210,886 | A | 5/1993 | Coe, III | |
| 5,217,042 | A | 6/1993 | Delle Cave | |

(Continued)

FOREIGN PATENT DOCUMENTS

GB        225 0770        6/1992

(Continued)

*Primary Examiner*—Stephen M. Hepperle
(74) *Attorney, Agent, or Firm*—Clifford B. Perry (57) ABSTRACT

A collection valve for use in a water reclamation system includes a drain pipe and a collection port assembly. The drain pipe includes an inlet port connectable to a drain line from which gray water is supplied, a collection inlet, and an outlet port. The collection port assembly includes a resilient cap and a collection port disposed to receive gray water flowing into the collection inlet and connectable to a gray water drain line. The resilient cap is operable to (i) close the collection inlet to permit water flow from the inlet port to the outlet port, or (ii) open the collection inlet to permit water flow from the inlet port to the collection port, whereby the resilient cap does not physically obstruct water flow within the drain pipe between he inlet port to the outlet port in either operational condition (i) or (ii).

19 Claims, 6 Drawing Sheets

U.S. PATENT DOCUMENTS

| | | |
|---|---|---|
| 5,217,323 A | 6/1993 | Bilson |
| 5,243,719 A | 9/1993 | McDonald et al. |
| 5,248,416 A | 9/1993 | Howard |
| 5,251,346 A | 10/1993 | Donati |
| 5,262,047 A | 11/1993 | Benskin et al. |
| 5,288,412 A | 2/1994 | Voorhees et al. |
| 5,303,728 A | 4/1994 | Senatore |
| 5,317,766 A | 6/1994 | McDonald et al. |
| 5,322,623 A | 6/1994 | Benskin et al. |
| 5,403,498 A | 4/1995 | Morrissey et al. |
| 5,406,657 A | 4/1995 | Donati |
| 5,409,616 A | 4/1995 | Garbutt et al. |
| 5,452,956 A | 9/1995 | Gilliam |
| 5,498,330 A | 3/1996 | Delle Cave |
| 6,139,729 A | 10/2000 | Gonzalez, Jr. |
| 6,282,733 B1 | 9/2001 | Gonzalez, Jr. |

FOREIGN PATENT DOCUMENTS

GB        231 4580        1/1998

* cited by examiner

Prior Art

COLLECTION VALVE FOR WATER RECLAMATION SYSTEM

CROSS-REFERENCE & INCORPORATION OF RELATED APPLICATIONS

This application claims the benefit of priority to U.S. Provisional Application No. 60/521,141, filed Feb. 25, 2004, herein incorporated by reference for all purposes. Further, the application is a continuation-in-part application of U.S. Non-Provisional application Ser. No. 10/616,891, filed Jul. 9, 2003 now U.S. Pat. No. 6,904,926 (referred to herein as the '891 Application), which is a Non-Provisional Application of Provisional Application 60/319,387, filed Jul. 10, 2002, now expired. The contents of each of the aforementioned applications are herein incorporated by reference in its entirety for all purposes.

BACKGROUND

The present invention relates to collection valves, and in particular to collection valves for use in water reclamation systems.

As known in the art, "gray" water refers to water containing low levels of contaminants and which is typically not potable, but can be recycled and used in particular applications, such as irrigation water, toilet water, as well as some industrial applications. Gray water typically originates from non-toxic household uses, such as from showers, bathtubs, and from non-chemical/toxic sink drainage. Gray water can also originate from the environment itself, for example, rain run-off from a gutter assembly of a home. "Black" water is distinguished from gray water in that black water contains a high amount of particulates and/or contaminants which requires heavy water treatment. Fresh or "white" water is water which is most commonly used by for drinking and cooking.

While fresh water is absolutely essential for life, it has become a diminishing resource around the world. As populations in arid areas continue to expand, drought conditions affect wide spread areas, and pollution from factories and plants contaminate water reserves, fresh water is becoming more difficult to obtain, and increasingly expensive when it is possible to do so. In certain areas around the globe, fresh water has been completely exhausted or contaminated, and this trend is expected to become more pervasive in larger and more industrial areas.

Water reclamation has been a central point in proposed approaches to conserve fresh water resources, and the assignee of the present invention has proposed in the '891 application an improved system for reclaiming and distributing gray water from a common line through which black and gray water flow. Another approach for reclaiming gray water from a common black and gray water line was proposed in UK Patent Application GB 2250770A to Milligan.

Figure 1:
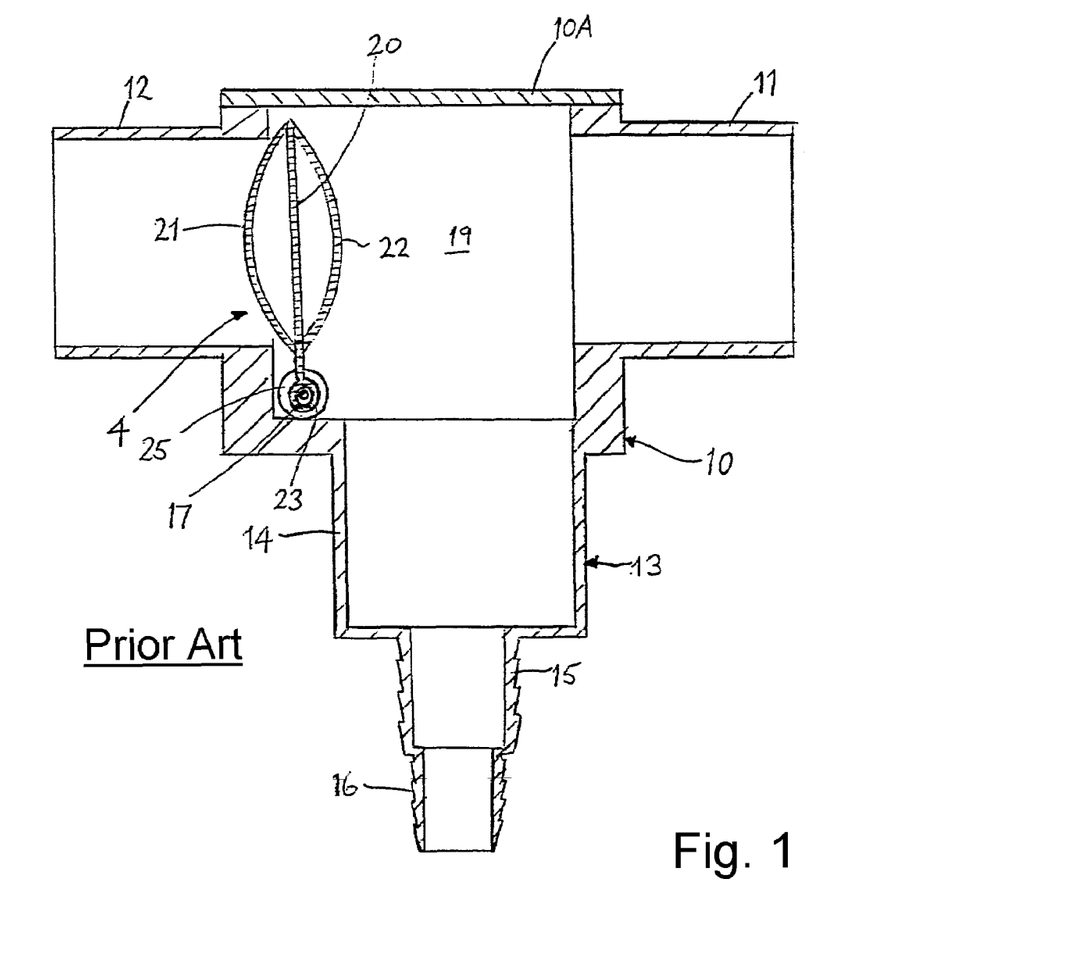
FIG. 1 illustrates a gray water collection valve for use in a water reclamation system as known in the art.

FIG. 1 illustrates the gray water collection valve presented in Milligan. The collection valve includes a first inlet (11) for receiving gray or black water, a first outlet (12) for connection to a black water drain line, and a second outlet (13) for diverting gray water. A plate (20) includes sealing surfaces (21 and 22) for sealing the first and second outlets 12 and 13, respectively. As shown, collection valve operates by either: (i) sealing the second outlet 13 and passing water flow through to the first outlet 12 when black water is received, or (ii) sealing the first outlet 12 and divert water flow to the second outlet 13 when gray water is received.

While the Milligan system is operable to separate gray and black water, it suffers from several disadvantages, one of which is the control of the collection valve. In particular, Milligan does not teach a system whereby detection of gray or black water flow could be sensed in order to control the position of the collection valve. Another disadvantage of the Milligan system is that the black water (main drain) line 12 is blocked during gray water collection. This method presents safety and health concerns should the main drain line remain blocked.

Accordingly, a new gray water collection valve is needed to address the foregoing difficulties.

SUMMARY

The present invention provides a new collection valve operable to collect gray water without blockage of the black water line. The collection valve may also be configured to operate automatically to safely recover gray water in a mixed system in which both gray and black water are supplied along the same drain line.

In a particular embodiment, the collection valve includes a drain pipe and a collection port assembly. The drain pipe includes an inlet port connectable to a drain line from which gray water is supplied, a collection inlet, and an outlet port. The collection port assembly includes a resilient cap and a collection port disposed to receive gray water flowing into the collection inlet and connectable to a gray water drain line. The resilient cap is operable to (i) close the collection inlet to permit water flow from the inlet port to the outlet port, or (ii) open the collection inlet to permit water flow from the inlet port to the collection port. As further described below, the resilient cap operates in such a manner as to not physically obstruct water flow between inlet port and the outlet port in either operational condition (i) or (ii).

These and other features of the invention will be better understood when taken in view of the following drawings and detailed description of exemplary embodiments.

For clarity, previously-identified features retain their reference indicia in subsequent drawings.

DETAILED DESCRIPTION OF EXEMPLARY EMBODIMENTS

Figure 2:
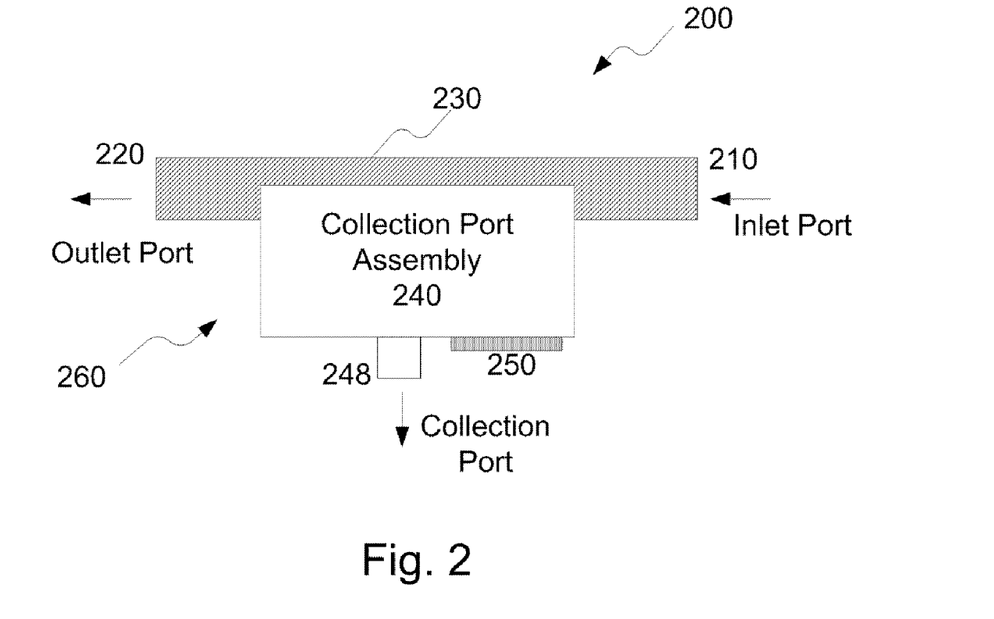
FIG. 2 illustrates a block diagram of a collection valve for use in a water reclamation system in accordance with the present invention.

FIG. 2 illustrates a block diagram of a gray water collection valve in accordance with the present invention. As shown, the collection valve 200 includes a drain pipe 230 having an inlet port 210 and an outlet port 220, a collection port assembly 240, a controller 250, and one or more sensors 260. In a particular embodiment of the invention, the inlet port 210 is connectable to a drain line which supplies gray water. For example, the inlet port may be adapted to collect run-off rain water from a gutter system. Such water is referred to herein as "gray" water, in that it has not previously undergone water treatment. In another embodiment of the invention, the inlet port 210 of drain pipe 230 is connectable to a line which supplies either gray or black water. Such a system, for example, the main drain line in a household, is further described in the '891 application herein incorporated by reference.

The outlet port 220 is connectable, in one embodiment, to a black water drain line, such as a sewer main. The collection port 248 of the collection port assembly is connectable to a gray water drain line. In a particular embodiment, the collection port 248 is connectable to a gray water collection tank and distribution system, an exemplary embodiment of which is further described in the assignee's '891 application.

The collection valve 200 further includes a collection port assembly 240. As further described below, the collection port assembly 240 operates to control the position of a resilient cap in releasing water out of the collection port 245. In a specific embodiment, the collection port assembly 240 controls the position of the resilient cap so as to not physically obstruct the flow path within the drain pipe 230 between the inlet port 210 and the outlet port 220 either when water flow is directed between the inlet port 210 and the outlet port 220, or when water flow is directed between the inlet port 210 and the collection port 248. This process is further described below.

The collection valve controller 250 is operable to control operation of the collection valve 200, including the positioning of the resilient cap and operation of the sensors 260, as further described below. As is further illustrated in an exemplary embodiment below, the controller 250 can be made operable to receive a gray (or black) water event signal indicating the impending inflow of gray (or black) water into the collection valve, and responsive thereto, control a motor, solenoid, or any other actuator to open (or close) the collection port 248, as further described below. The generation and transmission of gray (or black) water event signals is described in greater detail in the '891 application. The controller 250 may additionally receive sensor information from one or more of the collection valve sensors 260 in order to confirm proper operation of the unit. In still a further embodiment, the controller 250 is operable to transmit status information to a master and/or slave controller, as described in the '891 application. The status information may include a present condition of the power supply of the collection valve 200 (e.g., power on, power off, battery condition, etc.), the position of the resilient cap (e.g., open, closed, blocked, etc.), drain pipe, and/or collection port sensor information (e.g. water flow detected, volume/rate of flow detected). The aforementioned signals and information may be communicated by any wireline or wireless signal, for example using low voltage DC lines, wireless ISM band, Bluetooth, 802.11x, or any other wired or wireless communication protocol. Further, optical means, such as fiber optic cable, or mechanical means such as wires, may be used to communicate the aforementioned signals and information in alternative embodiments of the present invention.

In a particular embodiment of the invention, the controller 250 is configured to operate in a fail-safe condition in which the collection port 248 is closed when no or insufficient power is provided to the collection valve 200. Further particularly, a battery or other portable power source may be used either as the primary power supply, or as a back-up power supply should the primary power source fail or be interrupted. Such power condition information (condition of the primary and back-up) may be included in the status information transmitted to the main system. Alternatively, the collection valve may be powered by other means for example pneumatically or via an electrical generator which obtains its power from the flow of water through the collection valve. Those skilled in the art will appreciate that many different modalities of power sources can be used, any of which can be employed in alternative embodiments under the present invention.

In a further embodiment, the collection valve 200 includes one or more sensors 260 operable to detect water flow within the drain pipe 230 and/or into or out of the collection port 248. Sensors 260 may be configured to detect water flow, as well as the volume/rate of water flow. Such information can be used to provide diagnostic information and detect when non-optimal conditions exist, e.g., detecting low water flow into or out of the collection port 248 when closed, possible due to blockage of, or deterioration in the resilient cap.

Figure 3A:
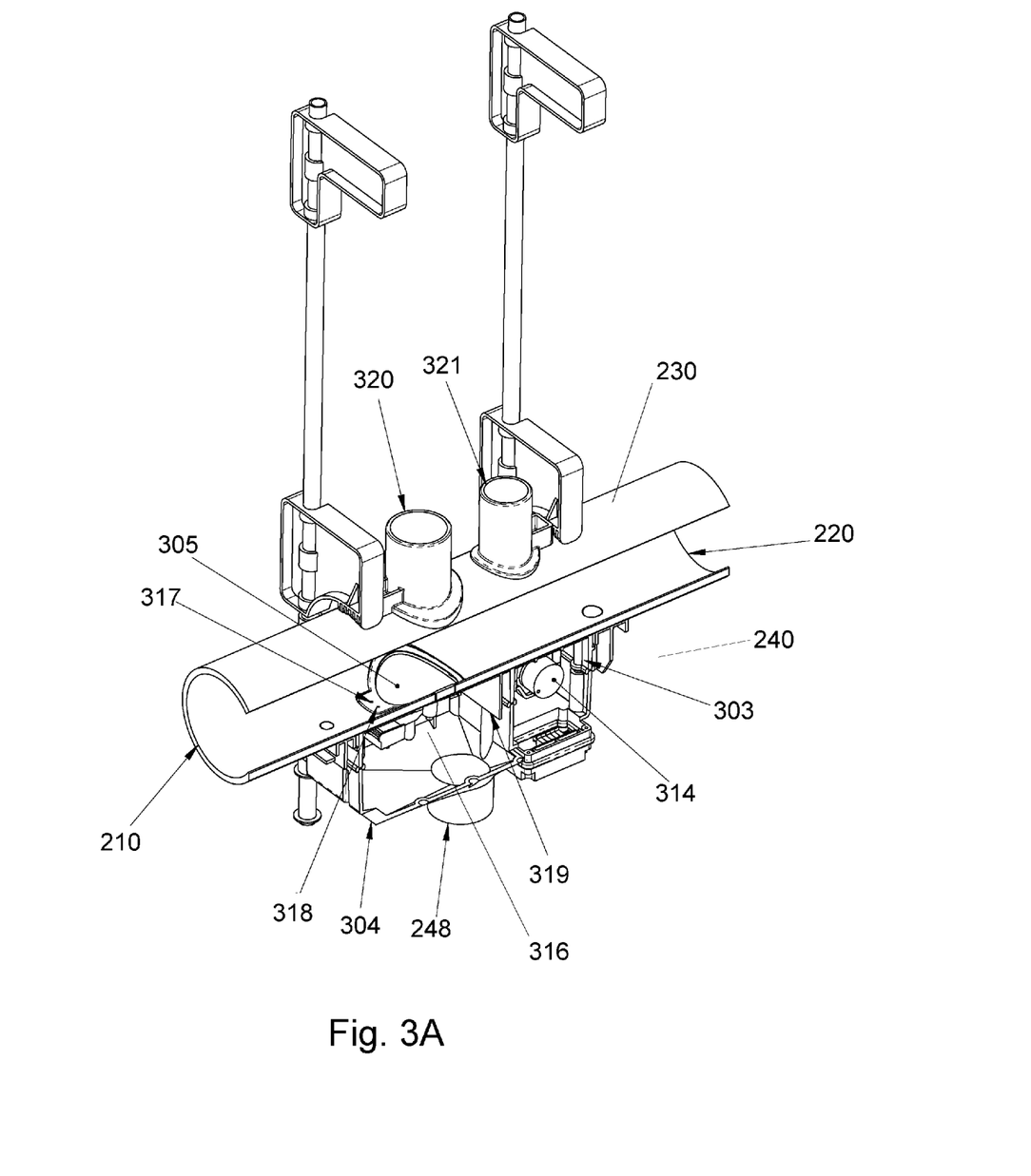
FIG. 3A illustrates a first cutaway perspective view of a collection valve in accordance with one embodiment of the present invention.

FIG. 3A illustrates a first cutaway perspective view of a collection valve with the collection port closed in accordance with the present invention. Along its longitudinal axis, the collection valve includes a drain pipe 230 having an inlet port 210 outlet port 220. In one exemplary embodiment, the collection valve is connected to a sewer pipe or septic system with the inflow of black water or gray water coming from a building into inlet port 210.

An upper assembly body 303 of the collection port assembly 240 includes a collection inlet 316 which can be opened and closed by means of a resilient cap 305 (shown in the closed position). To collect gray water, the resilient cap 305 is pivoted down by a motor 314 to open the collection inlet 316 in the valve body 303. This allows flow of gray water from the inlet port 210 and into the collection inlet 316. Gray water then flows down past the resilient cap 305 through the lower assembly body 304 and out of the collection port 248. Drain pipe sensors 317 and 318 are configured to detect water flow and or measure rate/volume of water flowing between the inlet port 210 and the outlet or collection ports 220 or 248, respectively. Collection port sensor 319 provides the same information for water flow into/out of the collection port 248. Port 320 is used as a service port to allow inspection and cleaning of the collection inlet 316 and the resilient cap 305. Port 321 is an auxiliary port and can be used for draining water into the sewer line. Although not shown, the motor 314 is coupled to the collection valve controller 250 and a power source (e.g., battery or line) and for receiving a motor control signal and power, respectively therefrom. Controller 250 is further operable to receive signals for the main drain line sensors 317 and 318, as well as the collection port sensor 319, the transmission of which may be via wire or wireless means. As provided above, the controller 250 may be further operable to receive signals (via wireline or wirelessly) from the master/slave controllers to open or close the collection port 248, and may reciprocally operable to communicate (via wireline or wirelessly) the sensor information supplied by the drain pipe and collection port sensors 317, 318, and 319.

In a specific embodiment of the invention, the resilient cap 305 does not obstruct the outlet port 220 when it is in an open position, and pivots down into the collection port assembly 240. If the resilient cap 305 is unable to pivot up to fully close, flow along the drain pipe 230 is not physically obstructed by the cap. In an alternative embodiment, the resilient cap 305 rotates laterally to open or close the collection inlet with some vertical movement to securely engage/disengage the collection inlet 316. In a specific embodiment, the collection valve is installed such that inlet port 210 and outlet port 220 are generally horizontal, with a slight downward flow from inlet port 210 to outlet port 220. With the collection inlet 316 closed, there is no obstruction to impede the flow from the inlet port 210 to the outlet port 220. The collection inlet 316 is located generally ninety degrees from the inlet and outlet ports 210 and 220 and is oriented in the down vertical position. When the collection inlet 316 is opened, it allows flow from the inlet port 210 to flow via gravity to the collection port 248. As described above, the collection valve can be installed on a main drain line to collect gray water when the valve is opened, and bypass black water when the valve is closed. Another use includes connecting the collection valve to collect run-off rain water for use in a gray water application such as irrigation. Those skilled in the art will appreciate that the collection valve may be used in other applications to recover gray water as well.

Figure 3B:
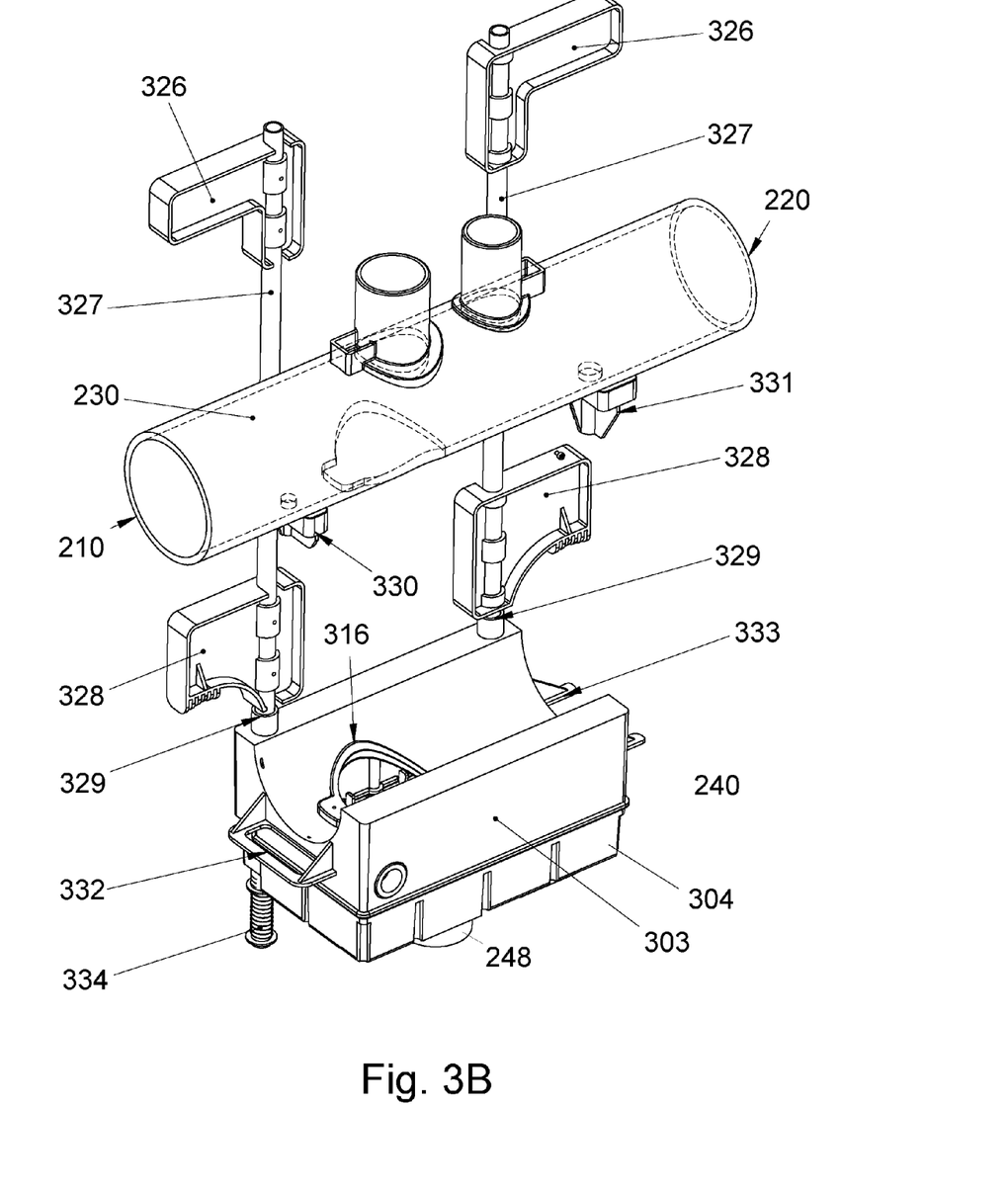
FIG. 3B illustrates a second perspective view of a collection valve in accordance with one embodiment of the present invention.

FIG. 3B illustrates a second perspective view of the collection valve in accordance with the invention. In the exemplary embodiment shown, the collection port assembly 240 is configured such that it can be easily removed from the drain pipe 230 in the case of servicing. The collection port assembly 240 and the drain pipe 230 are held together by two clamps 328. Clamps 328 are attached to rods 327 and the rods 327 can rotate about pivot points 329. In a further particular embodiment, rods 327 and clamps 328 are spring loaded by springs 334 which pull the clamps 328 down which exerts pressure on the drain pipe 230 and collection port assembly 240 when in the clamped position.

Clamps 328 can be rotated about pivot points 329 by means of handles 326 that are attached to the rods 327. By rotating handles 326, 90 degrees from clamped position the clamps clear the drain pipe and the collection port assembly 240 can be pushed down and disengaged from the drain pipe 230. The collection port assembly 240 can then be lifted up by the handles 326 and serviced, while the drain pipe 230 remains attached at the inlet and outlet ports 210 and 220. To facilitate re-attaching the collection port assembly 240 to the drain pipe 230, one or more alignment guides 330 and 331 may be attached to the drain pipe 230. These guides 330 and 331 align with features 332 and 333 in the collection port assembly 240.

Figure 4:
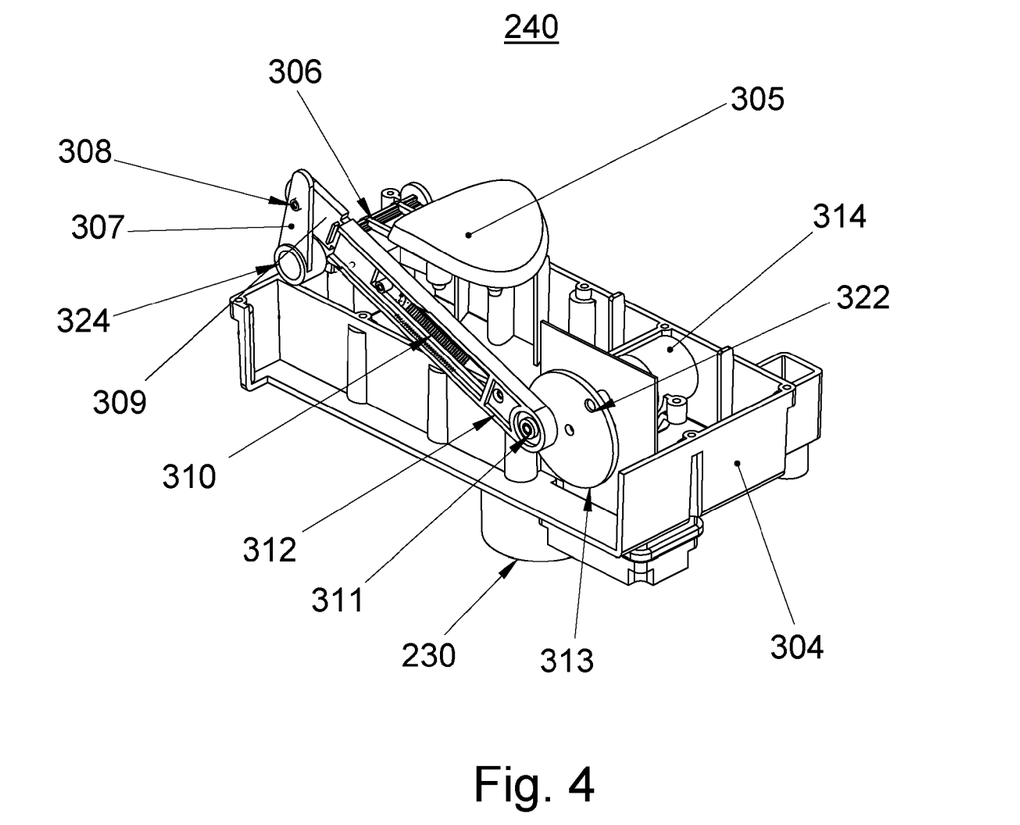
FIG. 4 illustrates a cutaway view of the collection port assembly in accordance with one embodiment of the present invention.

FIG. 4 illustrates a cutaway view of the collection port assembly 240 in accordance with one embodiment of the present invention. During operation, a motor 314 rotates a cam 313. As the cam 313 rotates it is connected at pivot point 311 to a lever 312 that can move back and forth. Lever 312 and lever 309 are connected together via a spring 310. This spring 310 allows for over-travel on the lever 312, and allows the motor to turn even if there is partial blockage of the collection inlet 316 which does not permit complete closure of the cap 305. Lever 309 is connected to a crank 307 at pivot point 308. Crank 307 and cap arm 306 are connected together and pivot around bushing 324. The resilient cap 305 is attached to the cap arm 306. When the cap arm 306 is pivoted up, the resilient cap 305 closes against the collection inlet 316 (not shown), thus preventing the flow of black water into the collection port 248. A magnet 322 on cam 313 is used to determine the position of the cap 305 to determine if it is opened or closed, and is coupled to the controller 250 (not shown) for communicating this information. A resilient gasket 315 (shown in FIG. 5) is used as a seal between the upper body 303 and the lower body 304.

Figure 5:
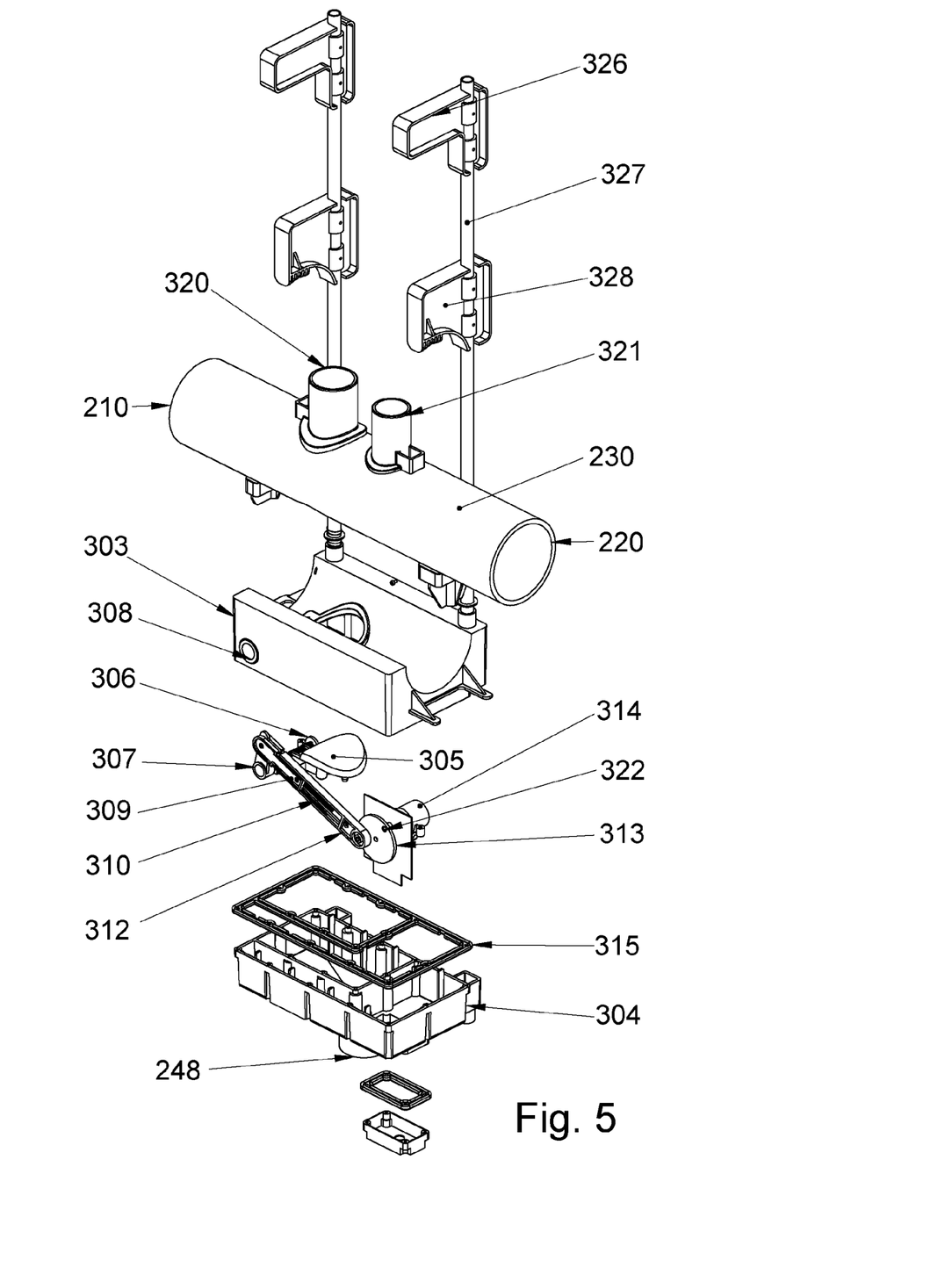
FIG. 5 illustrates an exploded view of a collection valve in accordance with one embodiment of the present invention.

FIG. 5 illustrates an exploded view of a gray water collection valve in accordance with one embodiment of the present invention, with previous-identified features retaining their reference indicia. As shown, the drain pipe 230 is detachably connected to the upper assembly body 303 of the collection port assembly, the lower assembly body 304 housing the motor and mechanics to control the resilient cap 305 to open or close the collection inlet 316. When opened, water flow is permitted into the lower assembly body 304 and out of the collection port 248.

The foregoing description of the collection valve has been presented in terms of a gray water reclamation system for purposes of illustration and description. However, those skilled in the art will appreciate that the collection valve design and architecture of the present collection valve is not limited to this particular application, but can be used for a host of other applications as well. As an example, the collection valve may be used for general water reclamation purposes, such as rain water collection in which the collection valve is used to divert and collect rain water via the collection port from a main line carrying the rain water to a sewer main line. In another embodiment, the collection valve design may be adapted on an appropriate scale for use in micro-fluidic arrays in which a collection port is desired or required. Accordingly, the above exemplary description is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A collection valve for use in a water reclamation system, the collection valve comprising:
   a drain pipe having an inlet port connectable to a drain line in which gray water flows, a collection inlet, and an outlet port;
   a drain pipe sensor operable to detect water flow within the drain pipe; and
   a collection port assembly, comprising:
      a collection port disposed to receive gray water flowing into the collection inlet, the collection port connectable to a gray water drain line; and
      a cap operable to (i) close the collection inlet to permit water flow from the inlet port to the outlet port, or (ii) open the collection inlet to permit water flow from the inlet port to the collection port,
   wherein the cap does not physically obstruct water flow within the drain pipe between the inlet port to the outlet port in either operational condition (i) or (ii).

2. A collection valve for use in a water reclamation system, the collection valve comprising:
   a drain pipe having an inlet port connectable to a drain line in which gray water flows, a collection inlet, and an outlet port; and
   a collection port assembly, comprising:
      a collection port disposed to receive gray water flowing into the collection inlet, the collection port connectable to a gray water drain line;
      a collection port sensor operable to detect water flow into or out of the collection port; and a cap operable to (i) close the collection inlet to permit water flow from the inlet port to the outlet port, or (ii) open the collection inlet to permit water flow from the inlet port to the collection port,
wherein the cap does not physically obstruct water flow within the drain pipe between the inlet port to the outlet port in either operational condition (i) or (ii).

3. The collection valve according to claim 1, further comprising a collection valve controller operable to control the position of the cap responsive to a sensor signal received.

4. The collection valve according to claim 3, wherein the collection valve controller is operable to position the cap to open the collection inlet on receiving a gray water event signal indicating the impending flow of gray water into the inlet port.

5. The collection valve according to claim 3, wherein the inlet port is connectable to a drain line within which gray water of black water flows, and wherein the collection valve controller is operable to position the cap to close the collection inlet on receiving a black water event signal indicating the impending flow of black water into the inlet port.

6. The collection valve according to claim 3, wherein the sensor signal is communicated to the collection port controller via wire.

7. The collection valve according to claim 3, wherein the sensor signal is a wireless signal.

8. The collection valve according to claim 3, wherein the collection valve controller is operable to position the cap to close the collection inlet under one or more predefined conditions.

9. The collection valve according to claim 3, wherein the collection valve controller is further operable to transmit a status signal.

10. The collection valve according to claim 9, wherein the status signal consists of status information selected from the group consisting of: (i) power supply condition, (ii) the position of the resilient cap, (iii) drain pipe sensor information, and (iv) collection port sensor information.

11. A collection valve for use in a water reclamation system, the collection valve comprising:
    a drain pipe having an inlet port connectable to a drain line in which gray water or black water flows, a collection inlet, and an outlet port; and
    a collection port assembly, comprising:
        a collection port disposed to receive gray water flowing into the collection inlet, the collection port connectable to a gray water drain line; and
        a cap operable to (i) close the collection inlet to permit water flow from the inlet port to the outlet port, or (ii) open the collection inlet to permit water flow from the inlet port to the collection port, wherein the cap does not physically obstruct water flow within the drain pipe between the inlet port to the outlet port in either operational condition (i) or (ii); and
    a collection valve controller operable to control the position of the cap responsive to a sensor signal received.

12. The collection valve according to claim 11, wherein the collection valve controller is operable to position the cap to open the collection inlet on receiving a gray water event signal indicating the impending flow of gray water into the inlet port.

13. The collection valve according to claim 11, wherein the collection valve controller is operable to position the cap to close the collection inlet on receiving a black water event signal indicating the impending flow of black water into the inlet port.

14. The collection valve according to claim 11, further comprising a drain pipe sensor operable to detect water flow within the drain pipe.

15. The collection valve according to claim 11, further comprising a collection port sensor operable to detect water flow into or out of the collection port.

16. The collection valve according to claim 11, wherein the collection valve controller is further operable to transmit a status signal.

17. The collection valve according to claim 16, wherein the status signal consists of status information selected from the group consisting of: (i) power supply condition, (ii) the position of the resilient cap, (iii) drain pipe sensor information, and (iv) collection port sensor information.

18. The collection valve according to claim 16, wherein the status signal is communicated via wire.

19. The collection valve according to claim 16, wherein the status signal is a wireless signal.

* * * * *